United States Patent [19]

Kaduk

[11] 4,395,388

[45] Jul. 26, 1983

[54] SYNTHETIC CRISTOBALITE

[75] Inventor: James A. Kaduk, Naperville, Ill.

[73] Assignee: Standard Oil Company (Indiana), Chicago, Ill.

[21] Appl. No.: 321,531

[22] Filed: Nov. 16, 1981

[51] Int. Cl.$^3$ .................. C01B 33/12; C01B 33/00
[52] U.S. Cl. .................... 423/339; 423/335; 423/338; 501/4
[58] Field of Search .............. 501/4; 423/325, 335, 423/338, 339

[56] References Cited

U.S. PATENT DOCUMENTS

| 1,669,363 | 5/1928 | Watson | 423/335 |
|---|---|---|---|
| 2,965,448 | 12/1960 | Hoover | 423/335 |
| 3,759,683 | 9/1973 | Dislich et al. | 501/4 |
| 4,061,724 | 12/1977 | Grose et al. | 423/339 |
| 4,073,865 | 2/1978 | Flanigen et al. | 423/339 |
| 4,269,813 | 5/1981 | Klotz | 423/326 |
| 4,300,911 | 11/1981 | Marosi et al. | 423/335 |
| 4,325,929 | 4/1982 | Young | 423/339 |
| 4,331,641 | 5/1982 | Hinnonkamp et al. | 423/326 |

*Primary Examiner*—Gary P. Straub
*Attorney, Agent, or Firm*—Wallace L. Oliver; William T. McClain; William H. Magidson

[57] ABSTRACT

A method for preparing synthetic cristobalite comprises (1) preparing a mixture containing sources for an oxide of silicon and for an oxide of boron, a base of an alkali or alkaline earth metal or precursor of such base, a polyhydric alcohol, and water; and (2) maintaining the mixture at suitable reaction conditions to effect formulation of the cristobalite, said reaction conditions comprising a reaction temperature within the range of about 30° C. to about 300° C., a pressure of at least the vapor pressure of water at the reaction temperature, and a reaction time that is sufficient to effect crystallization.

7 Claims, No Drawings

SYNTHETIC CRISTOBALITE

BACKGROUND OF THE INVENTION

This invention relates to synthetic cristobalite and more particularly relates to a low temperature hydrothermal method to form cristobalite in high purity.

Crystalline silica is found in nature in three distinct structures, i.e., quartz, tridymite and cristobalite, as identified by x-ray diffraction analysis with each crystalline structure having polymorphic forms stable in different temperature ranges. In each such crystalline form of silica a silicon atom is bonded to four oxygen atoms in tetrahedral coordination. Each form represents a distinct arrangement of silicon-oxygen tetrahedra into a three-dimensional crystalline network. Generally, crystallization temperature determines which structure is formed. Quartz is formed by crystallizing silica at below about 867° C.; tridymite is formed at crystallization temperature of about 867° C. to about 1470° C.; and cristobalite is formed at temperatures above about 1470° C. Cristobalite exists in two polymorphic forms, i.e., low-cristobalite, also referred to as alpha-cristobalite, and high-cristobalite. High-cristobalite, the stable form of crystalline silica at temperatures above about 1470° C., converts to low-cristobalite when cooled through the temperature range of about 200°-275° C. Low-cristobalite is identified by x-ray diffraction analysis with reference to American Society for Testing and Materials X-Ray Powder Diffraction file number 11-695, incorporated by reference herein, which is based upon a sample prepared by the National Bureau of Standards at 1700° C. from silica gel. American Society for Testing and Materials X-Ray Powder Diffraction file number 4-359 for high-cristobalite is also incorporated by reference herein.

Although low-cristobalite is the stable crystalline form of silica at temperatures below the inversion temperature range of about 200°-275° C., low-cristobalite typically is made by a high temperature process. In such a process high-cristobalite is made first at temperatures usually above 1500° C. and then converted to low-cristobalite during a cooling operation.

U.S. Pat. No. 4,122,025 describes a high temperature roasting process to produce low-cristobalite in which quartz sand is roasted at temperatures in excess of 1200° C. and then cooled to cause high-cristobalite, thus formed, to convert to low-cristobalite. Although this process produces low-cristobalite, it uses expensive and energy intensive thermal cycles. In the process described in U.S. Pat. No. 4,122,025, energy costs may be decreased somewhat by using roasting temperatures below 1700° C.; however, 1500° C. is a practical lower limit due to contamination of the low-cristobalite product with other silica structures such as tridymite and unconverted quartz sand.

One objective of the present invention is to provide a process which does not require process temperatures as high as 1500° C. to produce low-cristobalite substantially free of other crystalline silica structures.

In U.S. Pat. No. 4,107,195, low-cristobalite is identified as a minor impurity in crystalline aluminosilicates produced in one example. In this example aluminosilicates are formed during the crystallization of a silica structure when a certain proportion of the $Si^{+4}$ atoms are replaced by atoms of aluminum. Other crystalline silicates are known to be formed when other atoms such as iron, boron, and chromium replace silicon atoms in a silica structure. In contrast to pure silicon, replacement by aluminum, boron, chromium, or iron results in a negative framework charge which requires a cation to be associated with the lattice. If such substitution occurs, the total valence of the metals in these structures can be counterbalanced by addition of other metal atoms, such as alkali and alkaline earth ions. Surprisingly, when boron is present during preparation of synthetic cristobalite by the hydrothermal method of this invention, the crystalline product is without contamination with crystalline silicates containing atoms such as aluminum, boron, iron or chromium incorporated within the silica framework. Another object of this invention is to prepare all-silica materials substantially without incorporation of such other atoms as aluminum, boron, iron or chromium within the lattice structure.

Cristobalite is almost wholly insoluble in water which makes it useful as an insoluble mechanically-cleaning abrasive component in liquid scouring cleaning compositions. Low cristobalite possesses a more desirable combination of high degree of hardness, very high degree of whiteness and lower specific gravity than conventional mineral powders used as abrasive substances. When used as a component of a cleaning composition, it is desired to have cristobalite free of iron and iron compounds. Another aspect of this invention is the development of a hydrothermal method to prepare synthetic cristobalite in a pure form having a very high degree of whiteness and without impurities such as iron.

Crystalline material prepared according to this invention can be used in various processes including; as a component of heat resistant caulking compositions, as catalyst carriers, as the major component of cores for investment casting process, as drying agents, as extracting agents, as a component of high quality ceramics or refractories and as a component of cleaning compositions. It is also desirable in these uses to have high purity cristobalite.

SUMMARY OF THE INVENTION

Synthetic cristobalite is prepared by a hydrothermal method which comprises: (1) preparing a mixture containing sources for an oxide of silicon and for an oxide of boron, a base of an alkali or alkaline earth metal or precursor of such base, a polyhydric alcohol, and water; and (2) maintaning such mixture at suitable reaction conditions to effect formation of cristobalite, said reaction conditions comprising a reaction temperature within the range of about 30° C. to about 300° C., a pressure of at least the vapor pressure of water at the reaction temperature, and a reaction time that is sufficient to effect crystallization.

BRIEF DESCRIPTION OF THE INVENTION

This invention is a hydrothermal method to make synthetic cristobalite, a modification of crystalline silica, using a polyhydric alcohol as an organic crystallization-altering compound. Cristobalite possesses a specified and distinguishing x-ray powder diffraction pattern.

The cristobalite of this invention can be prepared generally by crystallizing, at a controlled initial pH, an aqueous mixture containing a base of an alkali or alkaline earth metal or precursor of such base, sources for an oxide of boron and for an oxide of silicon, and an organic crystallization altering compound. Conditions of crystallization include a reaction temperature within the range of 30° C. to 300° C., a pressure of at least the vapor pressure of water at the reaction temperature, and a reaction time that is sufficient to effect crystallization.

Useful cations in this invention include alkali-metal and alkaline-earth-metal cations such as sodium, potassium, rubidium, calcium and magnesium. Ammonium cations may be used in conjunction with such metal cations. Since basic conditions are required for crystallization of the silica of this invention, the source of such cation usually is a hydroxide such as sodium hydroxide.

Example of sources for an oxide of silicon useful in this invention include silicic acid, ammonium silicate, tetraalkyl silicates, sodium silicate and Ludox, which is a trademark for a stabilized polymer of silicic acid manufactured by E. I. DuPont de Nemours & Co. Examples of sources for an oxide of boron are $H_3BO_3$, $B_2O_3$, and $H_3B_3O_6$. Especially preferred as a source for an oxide of boron is $H_3BO_3$.

Organic crystallization modifiers useful in this invention are polyhydric alcohols having a formula $R(OH)_n$ wherein R is a polyvalent hydrocarbyl radical of 2 to about 5 carbon atoms, preferably 2 or 3, and n is an integer of 2 to about 4, preferably 2 or 3. When the number of carbon atoms is larger than hydroxyl groups, preferably at least two of the hydroxyl groups are associated with adjacent carbon atoms. Typically, the polyhydric alcohols useful in this invention are selected from the dihydric alcohol series which begins with ethylene glycol (1,2-ethanediol) and the trihydric alcohol series of which glycerol (1,2,3-propanetriol) is the first member. Glycerol and ethylene glycol are the most preferred templates useful in this invention. Generally, alpha-hydroxy carboxylic acids can be substituted for the polyhydric alcohols.

Cristobalite is prepared according to the present invention by mixing an aqueous digestion medium of the hydroxide of an alkali metal or alkaline earth metal, together with a polyhydric alcohol and sources for an oxide of boron and an oxide of silicon. The mole ratios of the various reactants can be varied considerably to produce the cristobalite. In particular, the mole ratios of initial reactant concentrations for producing cristobalite can be varied as indicated in Table I below.

TABLE I

MOLE RATIOS OF INITIAL REACTANTS

| | Broad | Preferred | Most Preferred |
|---|---|---|---|
| $SiO_2/B_2O_3$ | 0.5-200 | 0.7-75 | 2.5-20 |
| $R(OH)_n/B_2O_3$ | 0.01-20 | 0.01-8 | 0.01-6.0 |
| $M_{2/v}O/B_2O_3$ | 0.05-1.10 | 0.10-9 | 0.5-4.5 |
| $H_2O/SiO_2$ | 2-5000 | 5-5000 | 5-2000 | wherein $R(OH)_n$ is a polyhydric alcohol, that is R is a polyvalent hydrocarbyl radical of 2 to about 5 carbon atoms, n is an integer 2 to about 4 and M is at least one cation having valence v, such as an alkali-metal or an alkaline-earth-metal cation. The above quantities can be varied in concentration in the aqueous medium.

During preparation acidic conditions generally should be avoided; however, during the initial mixing of the reactants, a pH of 5.5 or lower can be used prior to the addition of metal hydroxide. Advantageously, the pH of the mixture in the reaction system prior to crystallization should fall within the range of about 9.0 to about 13.5. Preferably, the pH of the system should be above 10.0 to about 13.0. A proper pH is conducive to formation of stable complexes of borates with polyhydric alcohols or with alpha-hydroxy carboxylic acids. Generally, the pH of the aqueous slurry may be further controlled by buffering with a buffer compound such as ammonium orthophosphate or sodium hydrogen carbonate. Other carbonates, such as sodium, potassium or ammonium carbonate, are useful to adjust the pH of the mixture in the reaction system prior to crystallization.

Concentrated metal hydroxide is added at any stage of the mixing of the various components. However, it can be added initially to a convenient amount of water to adjust the initial pH to about 13.2 or more. Typically, after the source of boron is dissolved in the basic solution, the organic crystallization altering compound is added to the solution with each reagent allowed to dissolve completely before the next is added. Preferably, the final reagent added is an aqueous dispersion of silica particles. Such a silica sol is added rapidly to the solution, while the solution is being agitated vigorously. Vigorous agitation typically is continued for about 15 minutes. When all of the ingredients are in solution, the resulting watery gel it is placed in an autoclave, or other pressurized vessel, that is maintained at a temperature ranging from about 50° C. to about 300° C., preferably about 125° C. to about 200° C. Preferably, the crystallization temperature is maintained below the decomposition temperature of the organic crystallization-altering compound. Broadly, the time of crystallization is about 2 to about 20 days and preferably is about 3 to about 10 days. Especially preferred conditions are stirring at about 165° C. for about seven days. At the completion of the crystallization, the crystalline material formed is removed from the autoclave, filtered, and washed with water. This wet material is mildly dried, typically in a forced draft oven for anywhere from a few hours to a few days at varying temperatures in the range of about 50° C. to 200° C., to form a dry cake which can then be crushed to a powder or to small particles and extruded, pelletized, or made into forms suitable for its intended use. Advantageously, the dry product can be calcined at temperatures in the range of about 400° C. to 700° C. for anywhere from a few hours to a few days.

Cristobalites synthesized according to the hydrothermal method of the present invention are pure white crystalline forms of silica. The very high degree of whiteness observed indicates low content of impurities such as iron. The crystalline structure of the synthetic cristobalites produced is identified by x-ray means while purity of the silica is confirmed by atomic absorption analyses. Alkaline earth or alkali metal (such as sodium) content generally is less than 0.3 wt.% and typically less than 0.15 wt.%. Generally, cristobalites synthesized according to this invention contain less than 0.1 wt.% boron and typically contain less than 0.05 wt.% boron. Other elements are present in the synthetic cristobalite of this invention only to the maximum extent such elements are contained as impurities in starting materials. For example, aluminum contamination in the starting silica typically results in less than 0.05 wt.% aluminum in the cristobalite. Other metal impurities, such as iron, are in very low concentration and generally are present at levels below 0.05 wt.%. These synthetic cristobalites may be used wherever other cristobalites are used.

X-ray powder diffraction measurements described herein were made on an x-ray Phillips diffractometer which utilized copper K alpha radiation in conjunction with an AMR focusing monochromometer and a theta compensating slit operating such that its aperture varies with the theta angle. The output from the diffractometer was processed through a Canberra hardware/software package and reported by way of a strip chart and tabular printout. The compensating slit of the Canberra package tends to increase the peak to background ratios while reducing the peak intensities at low theta angles (large interplanar spacings) and increasing the peak intensities at high theta angles (small interplanar spacings). In order to facilitate the reporting of the results obtained, the relative intensities, i.e., relative peak heights, were arbitrarily assigned the following values:

| Relative Peak Height | Assigned Strength |
|---|---|
| Less than 10 | VW (very weak) |
| 10-19 | W (weak) |
| 20-39 | M (medium) |
| 40-70 | MS (medium strong) |
| Greater than 70 | VS (very strong) |

These assigned strengths are used hereinafter.

In the subsequent tables interplanar spacings are represented by "d" and are expressed in terms of Angstrom units (A°) or nanometers (nm). The relative intensities are represented by the term "$I/I_o$" and the term "assigned strength" is represented by "A.S."

Typically the synthetic cristobalite prepared according to this invention has an x-ray powder diffraction pattern comprising the following x-ray diffraction lines and assigned strengths.

TABLE II

| d-spacing | | Assigned Strength |
|---|---|---|
| A | nm | |
| 4.05 ± 0.07 | 0.45 ± 0.007 | VS |
| 3.16 ± 0.05 | 0.316 ± 0.005 | VW-W |
| 2.91 ± 0.05 | 0.291 ± 0.005 | VW-W |
| 2.48 ± 0.03 | 0.248 ± 0.003 | W-M |
| 2.13 ± 0.02 | 0.213 ± 0.002 | VW |
| 1.93 ± 0.02 | 0.193 ± 0.002 | VW |
| 1.88 ± 0.02 | 0.188 ± 0.002 | VW-W |
| 1.71 ± 0.02 | 0.171 ± 0.002 | VW |
| 1.61 ± 0.02 | 0.161 ± 0.002 | VW-W |

The following examples are being submitted to enable one skilled in the art to more easily and more clearly understand the present invention and are being submitted for the purpose of illustration only, but do not limit the scope of the present invention.

EXAMPLE I

To a solution of 25.0 grams of sodium hydroxide, 37.0 grams of boric acid in 1200 grams of distilled water and 57.0 grams of glycerol were added 240 grams of Ludox HS-40 (40 wt.% $SiO_2$). The resulting mixture was agitated vigorously for 15 minutes. The resulting watery gel, with a pH of 10.5, was transferred into a clean two-liter crystallizer for crystallization at a temperature of about 165° C. After a crystallization period of one week, the resulting white solid material was filtered from the crystallization solution. The white filter cake was washed with approximately eight liters of distilled water, drained on the filter, mildly dried in a forced air oven overnight at a temperature of about 165° C., and calcined in an oven in static air at 590° C. for twelve hours.

Elemental analysis of the calcined solid indicated the product was 46.0 wt.% silicon which corresponds to purity of better than 97 wt.% silicon dioxide, 0.15 wt.% sodium, 400 ppm aluminum and 200 ppm boron. The x-ray diffraction pattern presented below identified this product as alpha-cristobalite.

| d, Å | d, nm | $I/I_o$ | A.S. | Two-Theta deg. |
|---|---|---|---|---|
| 4.09 | 0.409 | 100 | VS | 21.7 |
| 3.17 | 0.317 | 2 | VW | 28.1 |
| 2.96 | 0.296 | 2 | VW | 31.3 |
| 2.49 | 0.249 | 20 | M | 36.0 |
| 2.13 | 0.213 | 2 | VW | 42.4 |
| 1.88 | 0.188 | 2 | VW | 48.4 |
| 1.71 | 0.171 | 1 | VW | 53.5 |
| 1.62 | 0.162 | 3 | VW | 56.8 |
| 1.43 | 0.143 | 5 | VW | 65.0 |

EXAMPLE II

The procedure of Example I was repeated using 240 grams of Ludox HS-40, 27.0 grams of sodium hydroxide, 27.2 grams of boric acid, 57.0 grams of glycerol and 1200 grams of distilled water. Prior to transfer to the crystallizer the water gel had a pH of 11.5. Elemental analysis of the white product was 46.4 wt.% silicon (99.3 wt.% as $SiO_2$), 0.13 wt.% sodium, 400 ppm aluminum and 100 ppm boron. The x-ray powder diffraction pattern presented below identified this product as alpha-cristobalite.

| d, Å | d, nm | $I/I_o$ | A.S. | Two-Theta deg. |
|---|---|---|---|---|
| 4.07 | 0.407 | 100 | VS | 21.8 |
| 3.16 | 0.316 | 2 | VW | 28.3 |
| 2.86 | 0.286 | 3 | VW | 31.3 |
| 2.49 | 0.249 | 20 | M | 36.1 |
| 2.13 | 0.213 | 2 | VW | 42.5 |
| 1.94 | 0.194 | 1 | VW | 46.7 |
| 1.88 | 0.188 | 2 | VW | 48.5 |
| 1.71 | 0.171 | 1 | VW | 53.7 |
| 1.62 | 0.162 | 4 | VW | 56.8 |

EXAMPLE III

In this example, crystallization and handling of the product were performed in the same manner as that described in Example I except carbonate ions were used to facilitate formation of pure cristobalite. The initial solution was 24.2 grams of sodium hydroxide. 37.2 grams of boric acid, 1201.2 grams of distilled water and 57.0 grams of glycerol. After the glycerol was dissolved the pH of the solution was about 10.8. Then 244.3 grams of Ludox HS-40 were thoroughly dispersed in the solution to form a uniform slurry. The pH of this slurry was adjusted to about 10.6 by the addition of 0.85 grams of sodium hydroxide and 0.90 grams of sodium carbonate.

The resulting crystalline material was identified as pure alpha-cristobalite, by its x-ray powder diffraction pattern.

EXAMPLE IV

Using ethylene glycol as the organic compound to facilitate formation of crystalline product, another cristobalite was synthesized. It was synthesized from a mixture containing 4.0 grams of boric acid, 10.0 grams of ammonium orthophosphate, 5.0 grams of sodium hydroxide, 125 grams of distilled water and 25 milliliters of ethylene glycol.

The pH of this solution was adjusted to above 12 by the addition of 5.0 grams of sodium hydroxide, and 60 grams of Ludox HS-40 were dispersed in the solution to form a uniform slurry. This slurry was maintained under its autogenous pressure at temperatures in the range of about 350° F. to about 364° F. for 64 hours. After cooling, the clear liquid was separated from the white solids by filtration. The white filter cake was washed with distilled water and dried in vacuo at temperatures in the range of about 130° C. to 150° C. The solid material was identified as a mixture of alpha-quartz and cristobalite by x-ray powder diffraction analysis.

EXAMPLE V

High-cristobalite (beta-cristobalite) was synthesized using glycerol as a crystallization modifier. Two comparative experiments were conducted to study crystallization in the presence of isopropyl alcohol and methanol, respectively, Preparation Y and Preparation Z. No boron containing compound was used in the comparative example of Preparation W. The slurry preparation, crystallization, and handling of the product were performed in substantially the same manner as that described in Example I. Type and purity of product formed were determined by x-ray diffraction. Reaction and product data are presented in Table III.

TABLE III

| PREPARATIONS IN PRESENCE OF ALCOHOLS | | | | |
|---|---|---|---|---|
| | Example | Preparation | | |
| Sample | V | Y | Z | W |
| Reaction mixture compositions (grams) | | | | |
| $H_2O$ | 2000. | 2000. | 2000. | 1200. |
| $H_3BO_3$ | 50. | 18.5 | 100. | — |
| NaOH | 33. | 13.3 | 65. | 0.2 |
| Alcohol[(1)] | 27.$^g$ | 75.$^i$ | 22.$^m$ | 57.0$^g$ |
| Ludox HS-40 | 310. | 300. | 620. | 240. |
| pH of Digestion Mixture | 10.8 | 11.0 | 10.2 | 11.4 |
| Time of Digestion (Days) | 7 | 7 | 7 | 7 |
| Temperature of Digestion (°C.) | 165 | 165 | 165 | 165 |
| Product | High Cristobalite | Kenyaite | Amorphous and Quartz | No Solid Product |

[(1)]$^g$glycerol;
$^i$isopropyl alcohol;
$^m$methanol

I claim:

1. A method for preparing cristobalite, which comrises: (1) preparing a mixture containing sources for an oxide of silicon and for an oxide of boron, a base or precursor of such base, a polyhydric alcohol, and water, wherein the composition of the mixture of initial reactants in terms of mole ratios of oxides is:
$SiO_2/B_2O_3$: 0.5–200
$R(OH)_n/B_2O_3$: 0.01–20
$M_{2/v}O/B_2O_3$: 0.05–10
$H_2O/SiO_2$: 2–5000
wherein R is a polyvalent hydrocarbyl radical of 2 to about 5 carbon atoms, n is an interger of 2 to about 4, and M is at least one alkali or alkaline earth metal cation having a valence of v, or ammonium; and (2) maintaining the mixture at suitable reaction conditions to effect formulation of the cristobalite, said reaction conditions comprise a pH of the slurry prior to crystallization that falls within the range of about 9.0 to about 13.5, a reaction temperature within the range of about 30° C. to about 300° C. and a pressure of at least the vapor pressure of water at the reaction temperature.

2. The method of claim 1, wherein the source for an oxide of boron is $H_3BO_3$.

3. The method of claim 1, wherein said reaction time is within the range of about 2 to about 20 days.

4. The method of claim 3, wherein the composition of said mixture ratios of initial reactants:
$SiO_2/B_2O_3$: 0.7–75
$R(OH)_n/B_2O_3$: 0.01–8
$M_{2/v}/B_2O_3$: 0.10–9
$H_2O/SiO_2$: 5–5000.

5. The method of claim 3 wherein said polyhydric alcohol is glycerol or ethylene glycol.

6. The method of claim 3, wherein said reaction temperature is within the range of about 50° C. to about 300° C., said pH is within the range of about 10.0 to about 13.0, said reaction time is within the range of about 2 days to about 12 days, and the composition of said mixture falls within the following ranges of mole ratios of initial reactants:
$SiO_2/B_2O_3$: 0.5–200
$R(OH)_n/B_2O_3$: 0.01–20
$M_{2/v}O/B_2O_3$: 0.05–10
$H_2O/SiO_2$: 2–5000.

7. The method of claim 6, wherein the composition of said mixture falls within the following ranges of mole ratios of initial reactants:
$SiO_2/B_2O_3$: 0.7–75
$R(OH)_n/B_2O_3$: 0.01–8
$M_{2/v}O/B_2O_3$: 0.10–9
$H_2O/SiO_2$: 5–5000.

* * * * *